United States Patent
Baughman et al.

(10) Patent No.: US 10,171,525 B2
(45) Date of Patent: Jan. 1, 2019

(54) AUTONOMIC MEETING EFFECTIVENESS AND CADENCE FORECASTING

(71) Applicant: International Business Machines Corporation, Armonk, NY (US)

(72) Inventors: Aaron K. Baughman, Silver Spring, MD (US); Moncef Benboubakeur, Brno (CZ); Christian Eggenberger, Wil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 202 days.

(21) Appl. No.: 15/200,281

(22) Filed: Jul. 1, 2016

(65) Prior Publication Data
US 2018/0007101 A1    Jan. 4, 2018

(51) Int. Cl.
| | |
|---|---|
| *G06F 15/16* | (2006.01) |
| *H04L 29/06* | (2006.01) |
| *G06F 17/28* | (2006.01) |
| *G06F 17/27* | (2006.01) |
| *H04L 29/08* | (2006.01) |
| *G06Q 10/10* | (2012.01) |

(52) U.S. Cl.
CPC ........ *H04L 65/403* (2013.01); *G06F 17/2785* (2013.01); *G06F 17/28* (2013.01); *G06Q 10/10* (2013.01); *H04L 67/306* (2013.01)

(58) Field of Classification Search
CPC ...... G06Q 10/10; G06Q 50/01; G06Q 10/101; H04L 41/04; H04L 65/403; H04L 67/306; G06F 17/28; G06F 17/2785; G06N 5/02; G06N 5/04; G06N 99/005; G06N 5/022; G10L 15/1815

See application file for complete search history.

(56) References Cited

U.S. PATENT DOCUMENTS

| | | |
|---|---|---|
| 7,007,067 B1 | 2/2006 | Azvine et al. |
| 8,898,091 B2 | 11/2014 | Frank et al. |

(Continued)

FOREIGN PATENT DOCUMENTS

| | | |
|---|---|---|
| WO | 2000026827 A1 | 5/2000 |
| WO | 2000026829 A1 | 5/2000 |
| WO | 2011001291 A2 | 1/2011 |

OTHER PUBLICATIONS

Hassine et al; Agent-Based Approach to Dynamic Meeting Scheduling Problems, 1130-1137, Jul. 19-23, 2004, NY, USA.

(Continued)

*Primary Examiner* — David R Lazaro
(74) *Attorney, Agent, or Firm* — Garg Law Firm, PLLC; Christopher K. McLane

(57) ABSTRACT

Meeting participation data of a meeting of a group of participants in-progress is collected. The meeting participation data is analyzed to identify a topic being discussed in the meeting. Using a trend of affective states of a participant, a future affective state of the participant is forecasted relative to the topic. The future affective state is evaluated to conclude that data contributed by the participant at a future time in the meeting is not likely to progress the topic to completion by at least a specified degree. A cognitive system (cog) trained in the subject-matter is selected. The cog is added to the meeting before the future time and while the meeting is in-progress.

20 Claims, 10 Drawing Sheets

(56) References Cited

U.S. PATENT DOCUMENTS

| | | | |
|---|---|---|---|
| 8,965,822 B2 | 2/2015 | Frank et al. | |
| 9,076,108 B2 | 7/2015 | Frank et al. | |
| 2008/0235018 A1 | 9/2008 | Eggen et al. | |
| 2014/0164476 A1* | 6/2014 | Thomson | G06Q 10/101 709/203 |
| 2015/0086949 A1 | 3/2015 | Li et al. | |
| 2017/0177928 A1* | 6/2017 | Cunico | H04N 7/147 |
| 2017/0301037 A1* | 10/2017 | Baughman | G06Q 10/10 |
| 2018/0007101 A1* | 1/2018 | Baughman | H04L 65/403 |
| 2018/0098030 A1* | 4/2018 | Morabia | H04N 7/152 |

OTHER PUBLICATIONS

Arapakis; Affect-Based Information Retrieval, Feb. 2010.

Berry et al; Conflict Negotiation Among Personal Calendar Agents, AAMAS'06, 1467-1468, May 8-12, 2006, Hakodate, Hokkaido, Japan.

Berry et al; Deploying a Personalized Time Management Agent, AAMAS'06, May 8-12, 2006, Hakodate, Hokkaido, Japan.

Chohra et al; Negotiation Behaviors Based on Artificial Intelligence and Social and Cognitive Human-Agent Interaction, 2008.

Modi et al; CMRadar: A Personal Assistant Agent for Calendar Management, 169-181, 2005.

Fan et al; Short-Term Load Forecasting Based on a Semi-Parametric Addictive Model, IEEE 2011.

Garrido et al; Multi-Agent Meeting Scheduling: Preliminary Experimental Results, From: Proceedings of the Second International Conference on Multi agent Systems, 1996.

Goertzel et al; OpenCogPrime: A Cognitive Synergy Based Architecture for Artificial General Intelligence, IEEE, 2009.

Heath et al; Long Summer Days: Grounded Learning of words for the Uneven Cycles of Real World Events, IEEE, vol. 4, No. 3, Sep. 2012.

Kozierok et al; A Learning Interface Agent for Scheduling Meetings, ACM, 1992.

Martin et al; Kairoscope: Managing Time Perception and Scheduling through Social Event Coordination, May 7-12, Vancouver, BC, Canada, 2011.

Shakshuki et al; A Personal Meeting Scheduling Agent, London, Dec. 10, 2012. Accepted May 17, 2013, Published online Jul. 4, 2013.

Fan et al; Short-term load forecasting using semi-parametric additive models, pp. 1-7, DOI: 10.1109/PES.2011.6039207, Power and Energy Society General Meeting, 2011 IEEE.

Kolodziej et al; Meeting security and user behavior requirements in Grid scheduling, Simulation Modelling Practice and Theory—19, 213-226, 2010.

Chun et al; N—an agent-based negotiation algorithm for dynamic scheduling and rescheduling, Advanced Engineering Informatics 17, 1-22, 2003. https://www.researchgate.net/publication/222696818.

* cited by examiner

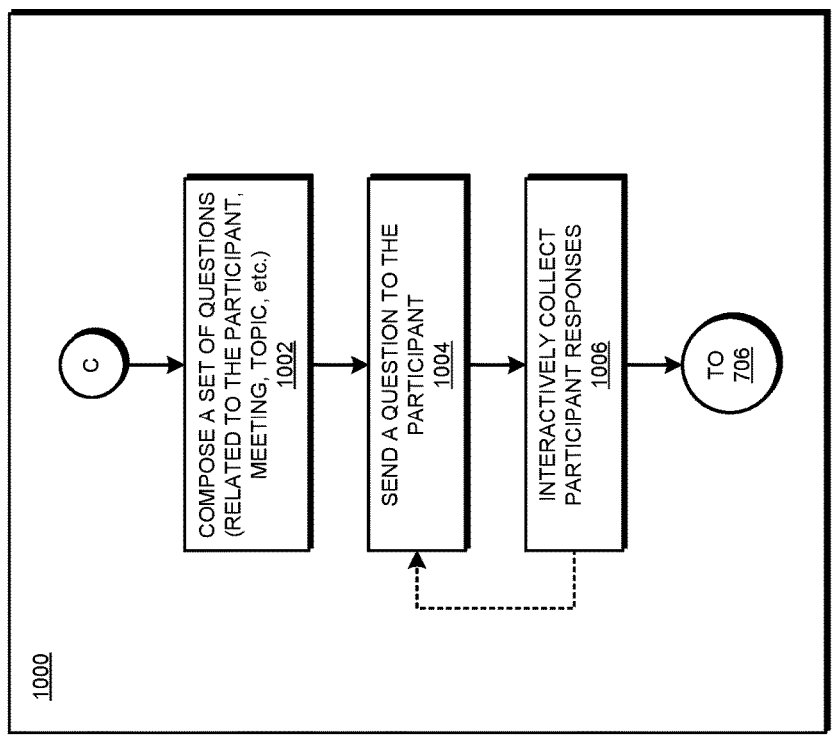

AUTONOMIC MEETING EFFECTIVENESS AND CADENCE FORECASTING

TECHNICAL FIELD

The present invention relates generally to a method, system, and computer program product for determining and improving the effectiveness of a meeting. More particularly, the present invention relates to a method, system, and computer program product for autonomic meeting effectiveness and cadence forecasting.

BACKGROUND

Hereinafter, a meeting is a gathering of human participants with an objective to discuss and resolve issues surrounding a subject-matter or entity. The subject-matter or entity of a meeting is collectively and interchangeably referred to herein as a "topic". Participants participate in a meeting by contributing information in any suitable form, including but not limited to text, human speech, audio, video, multimedia, or some combination thereof.

Natural language is written or spoken language having a form that is employed by humans for primarily communicating with other humans or with systems having a natural language interface.

Natural language processing (NLP) is a technique that facilitates exchange of information between humans and data processing systems. For example, one branch of NLP pertains to transforming human readable content into machine usable data. For example, NLP engines are presently usable to accept input content such as a newspaper article or human speech, and produce structured data, such as an outline of the input content, most significant and least significant parts, a subject, a reference, dependencies within the content, and the like, from the given content.

Another branch of NLP pertains to answering questions about a subject matter based on information available about the subject matter domain. This is the branch of cognitive analytics, and is also referred to as a Question and Answer system (Q and A system). Cognitive analytics is the process of analyzing available information or knowledge to create, infer, deduce, or derive new information.

A cognitive system (referred to herein as a "cog") is an implementation of a Q and A system. A Q and A system is an artificial intelligence application executing on data processing hardware. A Q and A system answers questions pertaining to a given subject-matter domain presented in natural language.

Typically, a Q and A system is provided access, or trained with, to a collection of domain specific information based on which the Q and A system answers questions pertaining to that domain. For example, a Q and A system accesses a body of knowledge about the domain, where the body of knowledge (knowledgebase) can be organized in a variety of configurations. For example, a knowledgebase of a domain can include structured repository of domain-specific information, such as ontologies, or unstructured data related to the domain, or a collection of natural language documents about the domain.

SUMMARY

The illustrative embodiments provide a method, system, and computer program product. An embodiment includes a method that collects meeting participation data of a meeting in-progress, the meeting including a group of participants. The embodiment analyzes the meeting participation data to identify a topic being discussed in the meeting. The embodiment forecasts, using a processor and a memory, using a trend of affective states of a participant, a future affective state of the participant relative to the topic. The embodiment evaluates the future affective state to conclude that data contributed by the participant at a future time in the meeting is not likely to progress the topic to completion by at least a specified degree. The embodiment selects a cognitive system (cog) trained in the subject-matter. The embodiment adds the cog to the meeting before the future time and while the meeting is in-progress.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 10 depicts a certain continuation of process 700 in accordance with an illustrative embodiment.

DETAILED DESCRIPTION

Figure 1:
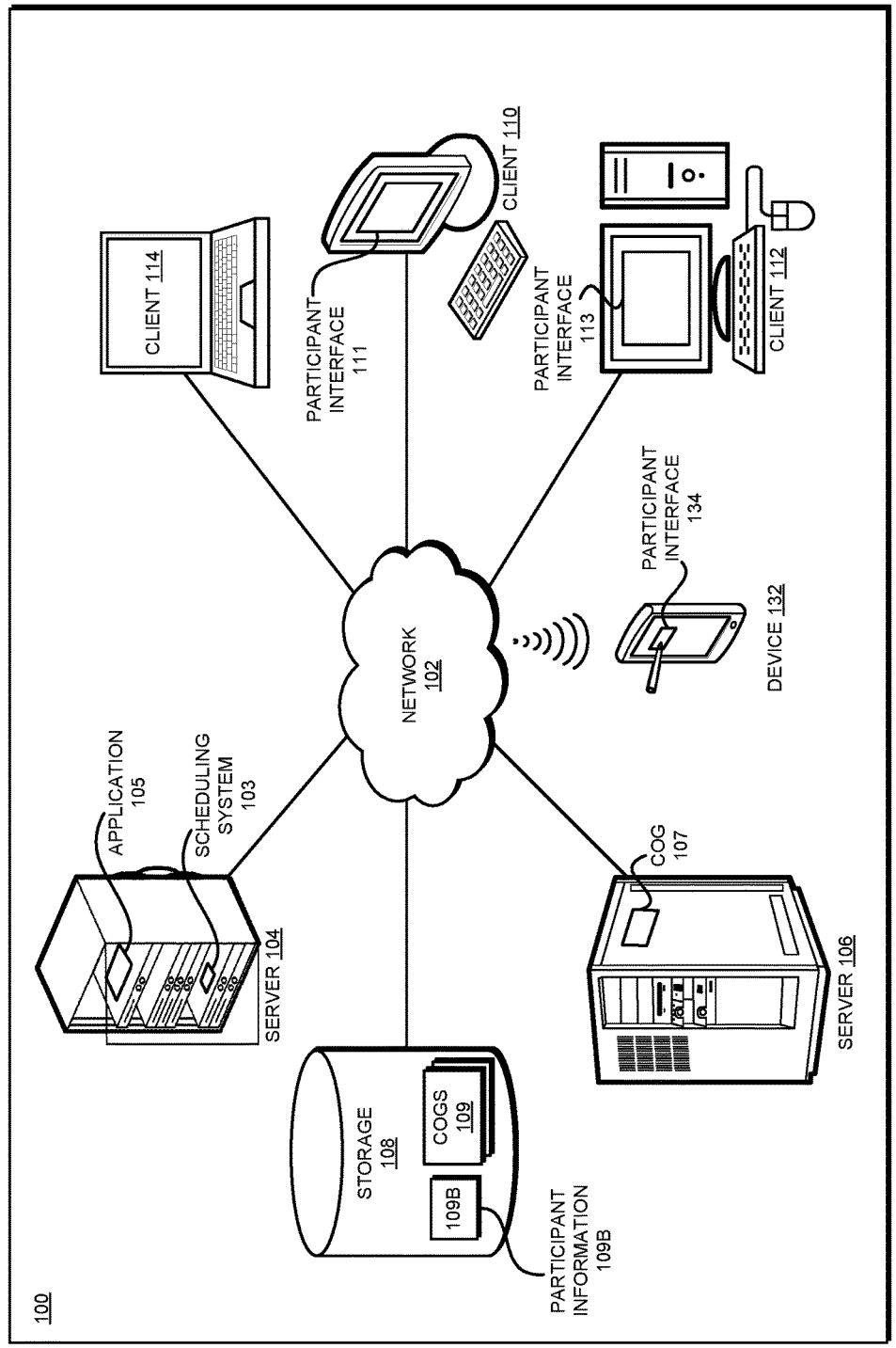
FIG. 1 depicts a block diagram of a network of data processing systems in which illustrative embodiments may be implemented.

The illustrative embodiments recognize that presently, no autonomic methodology exists to measure how effective a meeting is in resolving a topic of discussion at a given time, how effective the meeting will be to that end at a future time during the meeting, or both. Presently, human observation performed by a meeting leader is the only analysis that is available as a meeting progresses, and such analysis is highly subjective and inconsistent from meeting to meeting, time to time, leader to leader, and participant to participant.

The illustrative embodiments further recognize that presently, if a meeting is progressing ineffectively, not much else can be done about the meeting while the meeting progresses, but only a future meeting can be scheduled to readdress a topic. The meeting leader may reconvene the participant group or may change the composition of the group by adding or removing participants in some cases. Again, the scheduling and selection of participants is highly subjective and inconsistent from meeting to meeting, time to time, leader to leader, and participant to participant.

The illustrative embodiments recognize that an autonomous system to observe and analyze a meeting as the meeting progresses would be configurable to remove the subjectiveness. Such a system would also be able to analyzes a meeting to report, predict, and adjust, one or more effectiveness metrics about the meeting, a topic, a participant, the group of participants, or some combination thereof, in ways that are not possible or reliably performable by human actors or existing systems. Based on this analysis, such a system would further be able to select an optimal participant group for a future meeting and optimally schedule the future meeting. Based on the analysis, selection, and scheduling, such a system would further be able to set a cadence, pitch, or frequency of one or more future meetings that will likely result in optimal topic resolution and other results expected from such meetings.

The illustrative embodiments used to describe the invention generally address and solve the above-described problems and other problems related to measuring and predicting the effectiveness metrics of meeting participants, and measuring, predicting, and adjusting an effectiveness metric of a meeting.

An embodiment can be implemented as a software application. The application implementing an embodiment can be configured as a modification of an existing scheduling or calendaring system, as a separate application that operates in conjunction with an existing scheduling or calendaring system, a standalone application, or some combination thereof.

An effectiveness metric of a meeting is a measurement on a corresponding scale, that represents a ratio of completed objectives to a total number of objectives of a meeting, where the completed objectives are completed at least to a specified degree of completeness. An objective of a meeting can include, but is not limited to resolving a topic to a specified outcome.

An effectiveness metric of a meeting participant is a measurement on a corresponding scale, that represents a level of contribution of the participant in one or more objectives of a meeting, where the contribution is useful in progressing the objective towards completion.

A participant is equipped with, or associated with a participant system. The participant system is configured to provide a participant interface. The participant interface is usable by an embodiment to interact with the participant as described herein.

The participant system is also optionally configured to provide the participant's schedule information or interface with a scheduling system that manages, contains, or provides the participant's schedule information.

The participant system also preferably configured to include or interface with one or more biometric sensors that are usable by an embodiment to measure the participant's biometric responses. Some non-limiting examples of biometric sensors and the corresponding biometric responses include, a sensor usable to measure the body temperature, a sensor usable to measure the perspiration, a sensor usable to measure the infrared characteristics, a sensor usable to measure the pressure or speed applied to a keyboard or input interface, a sensor usable to measure a voice characteristic signature of speech, a sensor usable to measure a behavioral characteristic marker of a human, a sensor usable to measure the anxiety or irritability of a human, and many others.

The participant system is also optionally configured with one or more tools for participating in a meeting. Some non-limiting examples of meeting participation tools include, a tool or application to contribute or exchange voice or speech data to a meeting, a tool or application to contribute or exchange textual data to a meeting, a tool or application to contribute or exchange video or image data to a meeting, a tool or application to contribute or exchange multimedia data to a meeting, and many others.

A meeting environment is a physical space, such as a meeting room, in which a group of participants gather to conduct a meeting. Optionally, the meeting environment is configured with a set of biometric sensors, a set of meeting participation tools, or some combination thereof, as described herein.

A cog library is a collection of various cogs trained in various subject matter domains. A subject matter domain of a cog is applicable to one or more topics of a meeting. A cog trained in a subject-matter domain of a topic is configured to accept question inputs related to the topic and output one or more answers from the knowledgebase of the subject-matter domain in response.

An embodiment observes a meeting. In the observation, the embodiment collects meeting participation data of a participant from the meeting. Meeting participation data of a participant includes data contributed to the meeting by the participant during, before, or after the meeting via a meeting participation tool; biometric sensor data collected from the participant during the meeting; data collected through interactions via the participant interface during the meeting; or some combination thereof.

The embodiment analyzes the meeting participation data of a group of participants to identify a topic of the meeting. For example, the embodiment uses NLP to analyze the conversation of the group to identify the topic.

The embodiment analyzes the meeting participation data of the participant to determine an affective state and a somatic state of the participant related to a topic of the meeting. An affective state of the participant relative to the topic is a measurement or metric to indicate the participant's feelings towards the topic. Some example ways of determining the affective state of the participant relative to a topic include but are not limited to tonal analysis of the participant's text or voice meeting participation data, evaluating from the meeting participation data a social propensity of the participant towards the group, computing from the meeting participation data an emotion indicator value, establishing from the meeting participation data an analytical style adopted by the participant, measuring on a scale of sentiments a sentiment of the participant as analyzed from the meeting participation data, and the like.

A somatic state of the participant relative to the topic is a measurement or metric to indicate a biometric response of the participant corresponding to the affective state of the participant. For example, an example somatic state relates a certain value of the participant's facial infrared measurement when the participant's affective state indicates that the participant is upset about the topic at the meeting. Another example somatic state relates a certain value of the participant's keyboard input speed when the participant's affective state indicates that the participant is frustrated about a lack of attention to the participant's input on the topic.

Another example somatic state relates a certain value of the participant's voice characteristic when the participant's affective state indicates that the participant is confident about the participant's input on the topic. Another example somatic state relates a certain value of the participant's anxiety when the participant's affective state indicates that the participant is unprepared or uncomfortable with the topic.

These examples of affective states and somatic states are not intended to be limiting. From this disclosure, those of ordinary skill in the art will be able to conceive many other affective states, somatic states, and combinations thereof, and the same are contemplated within the scope of the illustrative embodiments.

In this manner the embodiment preferably observes several meetings in which a participant participates, and constructs a set of affective states and somatic states for the participants. The embodiment constructs a trend of the affective states and a trend of the somatic states for the participant. A trend is a function that represents a progression from one data point to another data point in a series of data points.

Using the trend of the affective states of a participant, given one data point of one affective state relative to one topic in a meeting, an embodiment can forecast a second affective state that is likely to be reached by the participant relative to the topic at a future time during or after the meeting. Similarly, using the trend of the somatic states of a participant, given one data point of one somatic state relative to one topic in a meeting, an embodiment can forecast a second somatic state that is likely to be reached by the participant relative to the topic at a future time during or after the meeting.

An embodiment observes a meeting in progress and collects the meeting participation data of a group of participants in the meeting. The embodiment analyzes the meeting participation data to determine a topic of the meeting. From the analysis of the meeting participation data, the embodiment further determines whether the topic has been resolved, i.e., completed to a specified degree. Depending on whether a topic remains unresolved or incomplete in a meeting, and whether the analysis reveals new topics to discuss in a future meeting, the embodiment constructs a list of topics for one or more future meetings.

If a topic is incomplete in the meeting, the embodiment determines whether a cog is available in a cog library that is suitable for the topic. When such a cog is available, the embodiment selects that cog and inserts the cog in the meeting. Inserting a cog in a meeting comprises enabling the cog to receive inputs from a meeting participant and provide an output responsive to the input where the output is configured to advance a topic to completion. The output becomes a part of the meeting participation data of the meeting.

For a participant in the group, the embodiment analyzes the meeting participation data to determine the affective and somatic states relative to a topic of the meeting at a first time during the meeting. In some cases, when a participant's affective and somatic states cannot be adequately determined from the meeting participation data, an embodiment interacts with the participant via the participant interface, e.g., by asking the participant questions and interactively receiving answers to those questions from the participant during the meeting. The embodiment uses such interactions with the participants in conjunction with the meeting participation data to determine the affective and somatic states of the participant.

Using the affective and somatic trends of the participant, an embodiment forecasts whether the participant is likely to achieve an affective state and a somatic state relative to the topic that are supportive of completing the topic. If the participant has a less than a threshold likelihood of attaining such states, the embodiment attempts to find and insert a cog in the meeting that can supplement or replace the participant while the meeting is progressing. Such supplementing or replacement adjusts and improves the likelihood that the topic will be completed in the meeting.

As is often the case, a particular participant may be a reason for the incompleteness of a topic in a meeting. The replacement or supplementation methodology described herein can be effective in minimizing the impact of such a participant on the meeting.

Furthermore, there may be circumstances when a cog cannot be inserted to supplement or replace the participant in the meeting. Under such circumstances, if the topic remains incomplete in the current meeting, the embodiment attempts to supplement or replace the participant with another participant or a cog in a future meeting where the topic will be discussed again.

Each participant in a pool or set of participants has a skill, expertise, experience and other information pertinent to a topic. A mapping between a topic and skills, expertise, experience, and/or other similarly purposed information corresponding to the topic is made available to an embodiment. Any number of such mappings may be created and made available to the embodiment.

An embodiment determines a topic of a future meeting as described herein. The embodiment also determines a skill, expertise, experience, and/or other information pertinent to the topic of the future meeting using the mappings described herein.

An embodiment selects from the set of participants, a subset of those participants who possess the needed combination of skill, expertise, and/or experience on the topic. From the subset, the embodiment selects a sub-subset of participants who have the availability on their schedules, at least a specified threshold level of affective state, at least a specified threshold level of somatic state, or a combination thereof, available for participating in the future meeting on the topic.

In some circumstances, more than one meeting may be needed to resolve a topic. An embodiment determines from analyzing the meeting participation data whether one future meeting will resolve the topic or more than one meeting are needed to resolve a topic.

The embodiment determines a time distance from the current meeting when the future meeting should be scheduled. The time distance is the pitch, frequency, or cadence of the future meeting or meetings. A total period within which a topic has to be resolved is configured in the embodiment. Depending on the number of meetings needed to resolve the topic, the cadence of the meetings is computed as [total period divided by the number of meetings]. One or more future meetings are then scheduled at the computed cadence using the sub-subset of participants and/or cogs, which can be selected differently for different future meetings.

A method of an embodiment described herein, when implemented to execute on a device or data processing system, comprises substantial advancement of the functionality of that device or data processing system in report, predict, and adjust, one or more effectiveness metrics about a meeting, a topic, a participant, the group of participants, or some combination thereof. For example, presently available methods for determining whether a meeting is effective, a topic has been resolved in the meeting, a participant or group has contributed as needed for the completion, and other such determinations are largely inconsistent and subjective observations of people participating in the meeting. Many such determinations cannot even be reliably performed by presently available people and systems despite being inconsistent and subjective. An embodiment provides autonomous system to observe and analyze a meeting as the meeting progresses and is configurable to remove the subjectiveness, inconsistency, and unreliability in evaluating the effectiveness of the meeting and the participants. An embodiment further analyzes a meeting to report, predict, and adjust, one or more effectiveness metrics about the meeting, a topic, a participant, the group of participants, or some combination thereof. Based on this analysis, an embodiment selects an optimal participant group for the current meeting or a future meeting and optimally schedule the future meeting. Based on the analysis, selection, and scheduling, an embodiment sets a cadence of one or more future meetings that will likely result in optimal topic resolution and other results expected from such meetings. This manner of autonomic meeting effectiveness and cadence forecasting is unavailable in the presently available methods. Thus, a substantial advancement of such devices or data processing systems by executing a method of an embodiment is in improving the selection of participants for the meetings, improving the outcome of meetings, reducing the number of meetings, and ensuring faster and better completion of topics in meetings by real-time replacement or supplementation of ineffective participants.

The illustrative embodiments are described with respect to certain types of meetings, topics, participants, systems, data, interfaces, sensors, tools, cogs, affective states, somatic states, trends, likelihoods, forecasts, mappings, scheduling systems, cadence computations, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
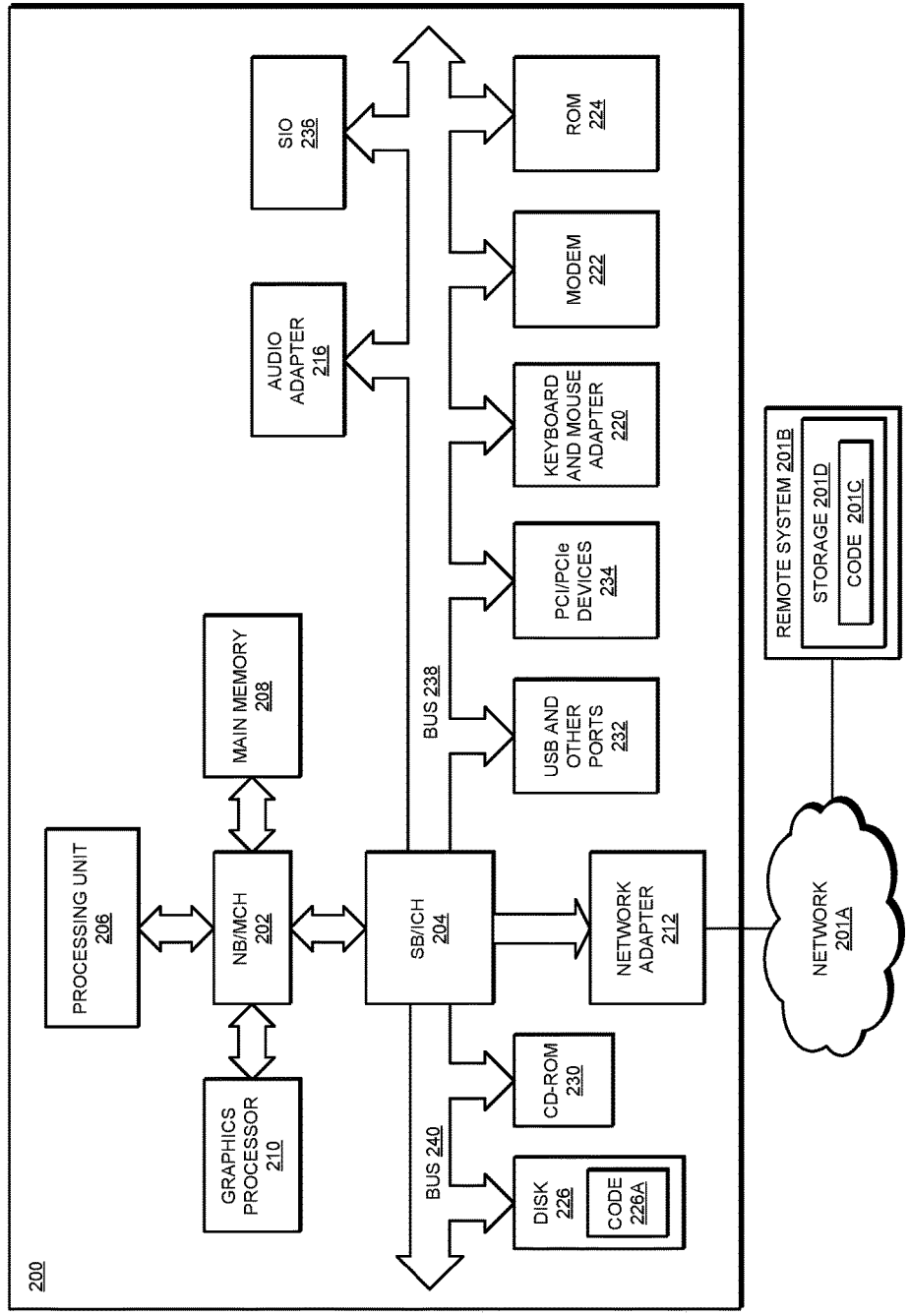
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be Implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Client 110, client 112, and device 132 are some non-limiting examples of participant systems, on which participant interfaces 111, 113, and 134, respectively, are configured as described herein. Application 105 uses participant systems 110, 112, and 132 to collect meeting participation data in a meeting. Application 105 inserts a cog, e.g., cog 107 from cogs library 109A in a meeting as described herein. Participant information 109B provides the skills, expertise, experience, and other similarly purposed data about a pool of participants, which is usable in a manner described herein. Scheduling system 103 provides the scheduling information about the participants who are considered for a meeting.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
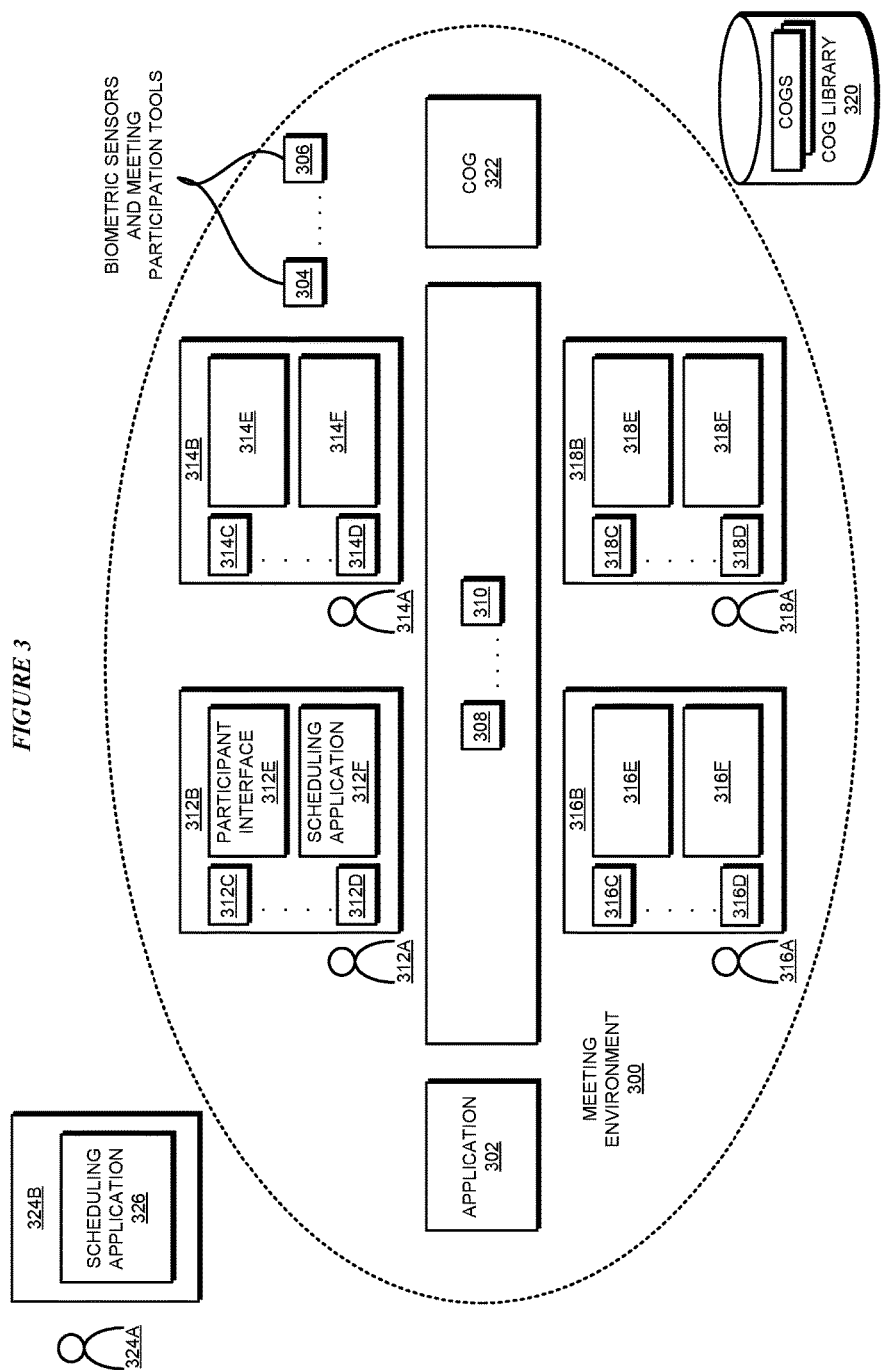
FIG. 3 depicts a block diagram of an example configuration for autonomic meeting effectiveness and cadence forecasting in accordance with an illustrative embodiment.

With reference to FIG. 3, this figure depicts a block diagram of an example configuration for autonomic meeting effectiveness and cadence forecasting in accordance with an illustrative embodiment. Application 302 is an example of application 105 in FIG. 1 and has access to or operates in meeting environment 300.

Meeting environment 300 may be, but need not necessarily be, configured with one or more biometric sensors, such as thermal cameras, seat pressure sensors, and the like. Meeting environment 300 may also be, but need not necessarily be, configured with one or more meeting participation tools, such as microphones, video cameras, and the like. Sensors and tools 306, 308, 310, and 312 are some examples of such biometric sensors and meeting participation tools that may be configured in meting environment 300.

Participant 312A is a participant in a meeting being conducted in meeting environment 300. Participant 312A is associated with and has access to participant system 312B. Participant system 312B includes one or more biometric sensors 312C, one or more meeting participation tools 312D, participant interface 312E, and scheduling application 312F.

Participant 314A is another participant in a meeting being conducted in meeting environment 300. Participant 314A is associated with and has access to participant system 314B. Participant system 314B includes one or more biometric sensors 314C, one or more meeting participation tools 314D, participant interface 314E, and scheduling application 314F.

Participant 316A is another participant in a meeting being conducted in meeting environment 300. Participant 316A is associated with and has access to participant system 316B. Participant system 316B includes one or more biometric sensors 316C, one or more meeting participation tools 316D, participant interface 316E, and scheduling application 316F.

Participant 318A is another participant in a meeting being conducted in meeting environment 300. Participant 318A is associated with and has access to participant system 318B. Participant system 318B includes one or more biometric sensors 318C, one or more meeting participation tools 318D, participant interface 318E, and scheduling application 318F.

Cog library 320 includes one or more cogs, e.g., cogs 109A in FIG. 1, that are trained on one or more subject-matter domains. Cog 322 is an example cog selected by application 302 from cogs library 320, and inserted into the meeting for any of the reasons and circumstances described herein.

Potential participant 324A is a participant available in a pool of participants who can also be scheduled to replace or substitute a participant in the meeting, e.g., participant 312A. Potential participant 324A can also be scheduled for a future meeting as described herein. Potential participant 324A has access to participant system 324B, which includes scheduling application 326. Application 302 can use scheduling application 326 to schedule potential participant 324A in the current or a future meeting.

Figure 4:
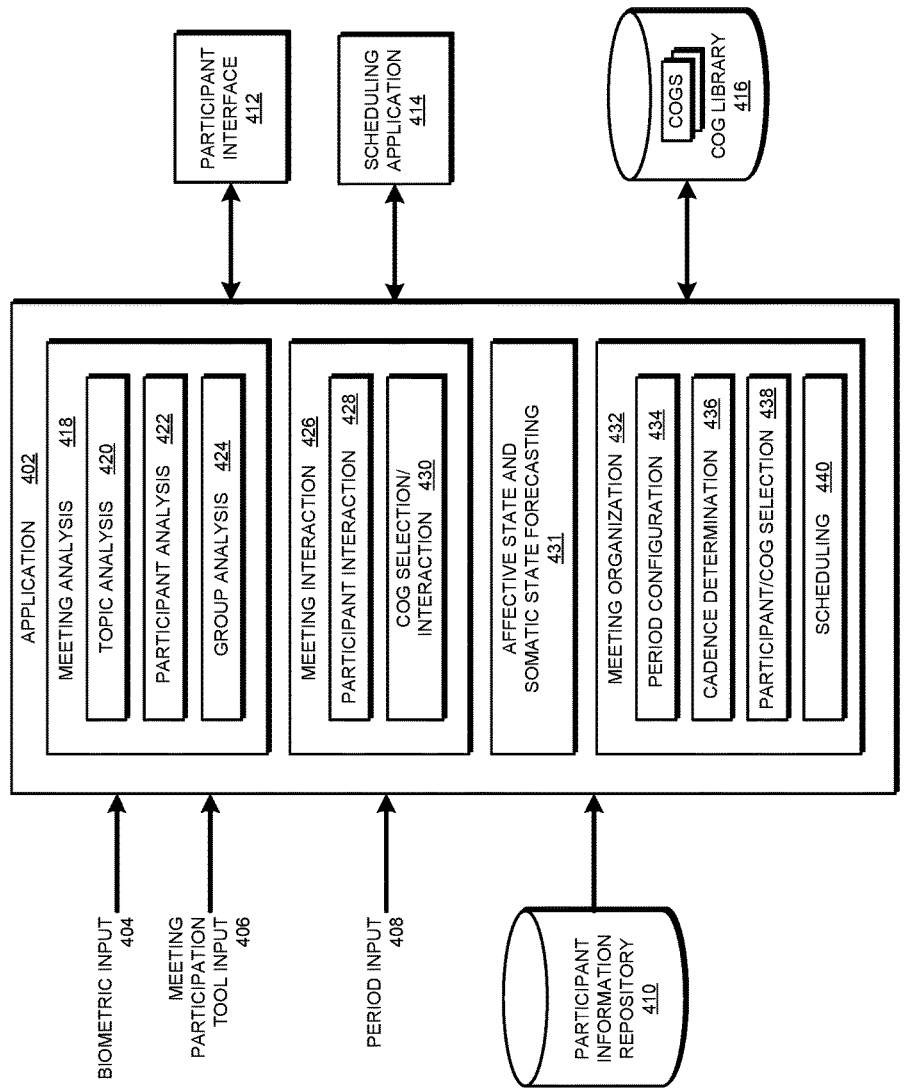
FIG. 4 depicts a block diagram of an application for autonomic meeting effectiveness and cadence forecasting in accordance with an illustrative embodiment.

With reference to FIG. 4, this figure depicts a block diagram of an application for autonomic meeting effectiveness and cadence forecasting in accordance with an illustrative embodiment. Application 402 is an example of application 302 in FIG. 3.

Application 402 receives input 404 from one or more biometric sensors and input 406 from one or more meeting participation tools, such as from any of biometric sensors and meeting participation tools 304-306, 308-310, 312C-

312D, 314C-314D, 316C-316D, and 318C-318D in FIG. 3. Inputs 404 and 406 form the meeting participation data of a meeting.

Input 408 specifies a total period over which a topic has to be resolved. Repository 410 provides participant information, e.g., participant information 109B in FIG. 1.

Participant interface 412 is one or more of participant interfaces 312E, 314E, 316E, and 318E in FIG. 3. Scheduling application 414 is one or more of scheduling applications 312F, 314F, 316F, and 318F in FIG. 3. Cogs library 416 is an example of cogs library 320 in FIG. 3 and includes one or more cogs as described herein.

Component 418 performs meeting analysis by analyzing meeting participation data collected from a meeting via inputs 404 and 406. Particularly, subcomponent 420 analyzes the meeting participation data to identify a topic of the meeting, subcomponent 422 analyzes a participant's affective state and somatic state relative to the topic, and subcomponent 424 analyzes the group interactions between the participants to determine whether a topic is progressing to completion, stalled, set aside, and the like.

When the meeting participation data of inputs 404 and 406 is insufficient for any of the analyses of component 418, component 426 interacts with one or more participants of the meeting to collect more information. For example, subcomponent 428 interacts with a participant by presenting one or more questions on the participant's participant interface and interactively receiving one or more answers therefrom. The information collected by subcomponent 428 is added to the meeting participation data for one or more analyses by component 418.

Subcomponent 430 selects one or more cogs from cogs library 416 in a manner described herein. Subcomponent 430 inserts the selected cog into the meeting, such as to supplement or replace a participant. For example, the cog selection and insertion by subcomponent 430 may depend on the affective state forecast and somatic state forecast produced by component 431 in a manner described herein.

For a topic, component 431 determines a set of affective states and related somatic states of a participant. Component 431 computes an affective state trend and a somatic state trend from the determined states. Component 431 applies the affective state trend to an affective state of the participant in a current meeting to forecast the participant's affective state at a future time during the current meeting. Component 431 applies the somatic state trend to a somatic state of the participant in a current meeting to forecast the participant's somatic state at a future time during the current meeting.

Component 432 organizes one or more future meetings in a manner described herein. Subcomponent 434 allows a user, such as a meeting participant, a meeting leader, or a project leader, to configure a total period via input 408. A total period can be configured for a single topic, a set of topics, a meeting, a set of meetings, or some combination thereof. Different total periods can be set for different topics, different sets of topics, different meetings, different sets of meetings.

Subcomponent 436 computes the cadence of the one or more future meetings. Subcomponent 438 selects one or more participants, e.g. the sub-subset of participants from a pool of participants as described herein. Subcomponent 438 may also select one or more cogs to participate in a future meeting being planned. Subcomponent 440 schedules the one or more future meetings with the selected sub-subset of participants, one or more cogs, or some combination thereof, according to the cadence and specified one or more total periods.

Figure 5:
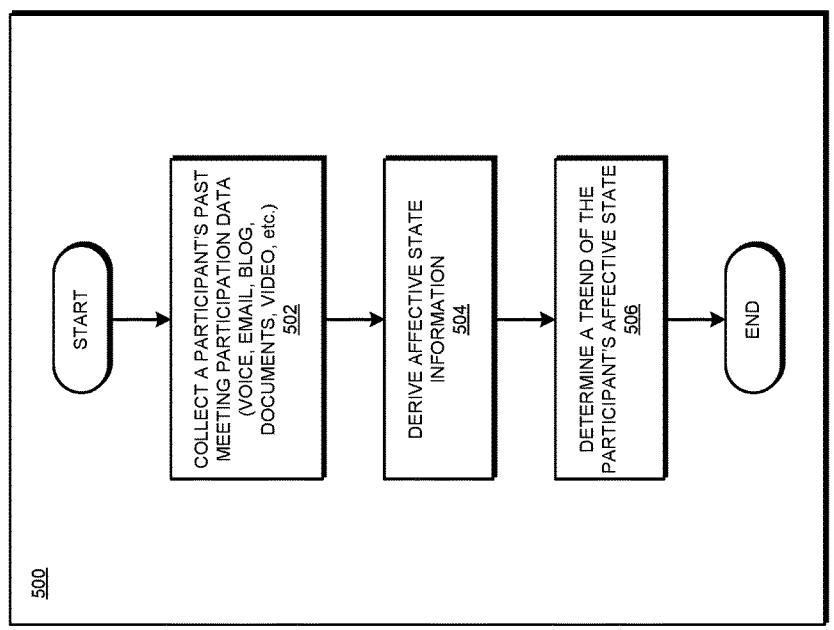
FIG. 5 depicts a flowchart of an example process for trending a participant's affective state in accordance with an illustrative embodiment.

With reference to FIG. 5, this figure depicts a flowchart of an example process for trending a participant's affective state in accordance with an illustrative embodiment. Process 500 can be implemented in application 402, such as in component 431 in FIG. 4.

The application collects a participant's past meeting participation data, e.g., voice/speech, emails, blogs, text, video, multimedia, or a combination thereof contributed by the participant in one or more past meetings (block 502). The application derives the affective state information from the participant's meeting participation data, e.g., in the form of one or more sets of affective states related to the corresponding one or more topics from the past meetings (block 504). The application computes a trend of the affective states from the affective state information (block 506). The application ends process 500 thereafter.

Figure 6:
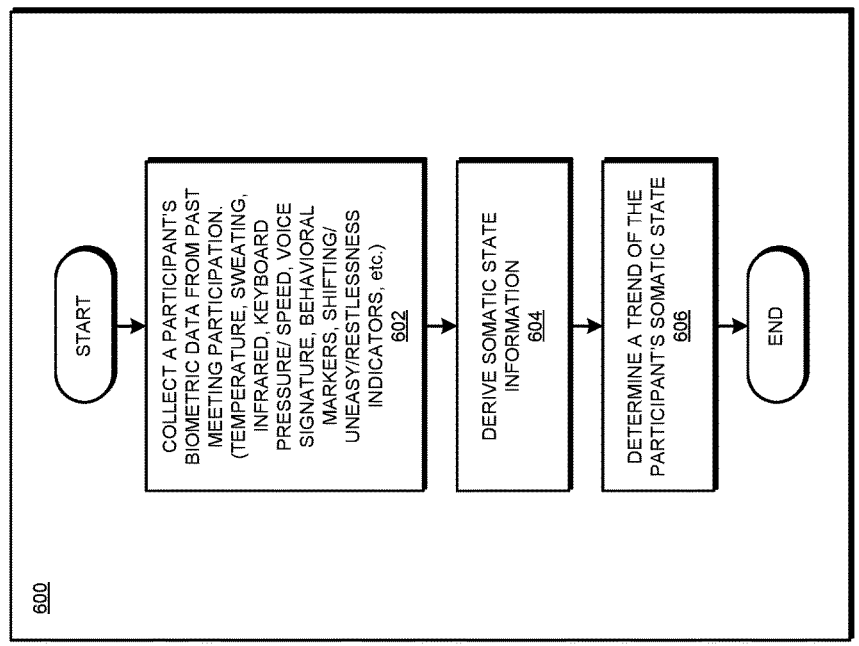
FIG. 6 depicts a flowchart of an example process for trending a participant's somatic state in accordance with an illustrative embodiment.

With reference to FIG. 6, this figure depicts a flowchart of an example process for trending a participant's somatic state in accordance with an illustrative embodiment. Process 600 can be implemented in application 402, such as in component 431 in FIG. 4.

The application collects a participant's past meeting participation data, e.g., biometric data of the participant in one or more past meetings (block 602). The application derives the somatic state information from the participant's meeting participation data, e.g., in the form of one or more sets of somatic states related to the corresponding affective states of one or more topics from the past meetings (block 604). The application computes a trend of the somatic states from the somatic state information (block 606). The application ends process 600 thereafter.

Figure 7:
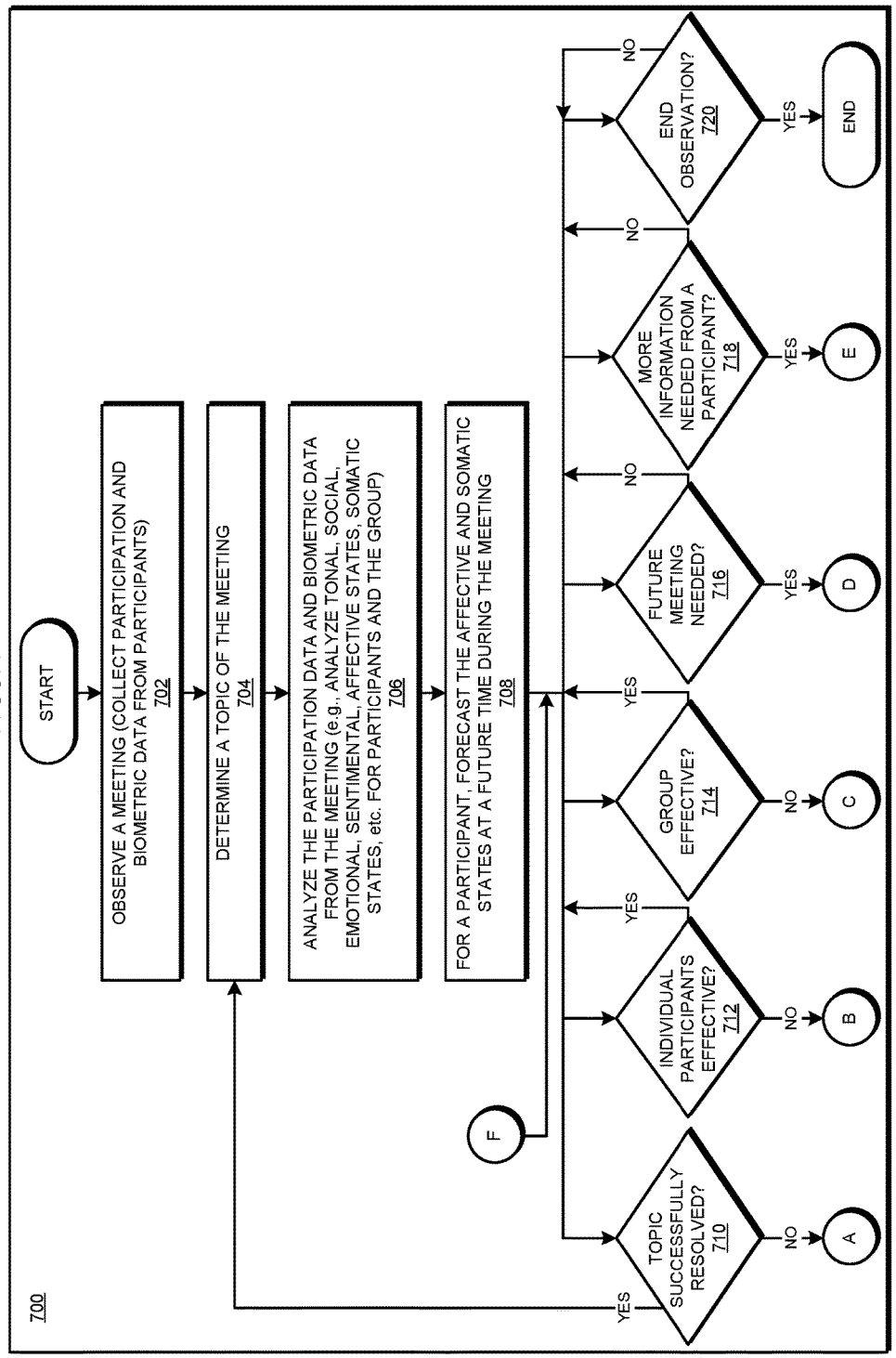
FIG. 7 depicts a flowchart of an example process for autonomic meeting effectiveness and cadence forecasting in accordance with an illustrative embodiment.

With reference to FIG. 7, this figure depicts a flowchart of an example process for autonomic meeting effectiveness and cadence forecasting in accordance with an illustrative embodiment. Process 700 can be implemented in application 402 in FIG. 4.

The application observes a meeting and collects the meeting participation data of the meeting as the meeting is progressing (block 702). The application analyzes the meeting participation data to determine a topic of the meeting (block 704).

The application analyzes the meeting participation data to determine whether the group of participants in the meeting are progressing the determined topic to completion or whether the group is stalled or frustrated with the topic having an above-threshold risk of remaining incomplete (block 706). The application identifies a participant whose effectiveness on the topic in the meeting should be analyzed. The application forecasts the participant's affective and somatic states for the topic at a future time in the meeting that is being observed (block 708). The application may repeat block 708 for more than one participants in the group.

The application considers numerous factors thereafter as shown in this figure. Note that within the scope of the illustrative embodiments, any of the described factors can be considered in any order relative to another factor or simultaneously with another factor. Furthermore, within the scope of the illustrative embodiments, a factor may be reconsidered or re-evaluated any number of times in process 700.

For example, as one factor, because the analysis and the factor evaluation occurs in near real-time as the meeting is progressing, the application determines whether the topic has been resolved, i.e., completed at least to a specified degree (block 710). If the topic has been resolved ("Yes" path of block 710), the application returns process 700 to block 704 to identify another topic for the current or future meeting. If the topic has not been resolved ("No" path of block 710), the application proceeds to exit point A to enter a process depicted in FIG. 8 which has a corresponding entry point A.

As another example factor, the application determines whether each individual participant evaluated in block 708 is effective on the topic, i.e., contributing to the topic at least to a specified degree to advance the topic towards completion (block 712). If the individual participants are effective, ("Yes" path of block 712), the application proceeds to evaluate other factors. If an individual participant is not effective ("No" path of block 712), the application proceeds to exit point B to enter a process depicted in FIG. 8 which has a corresponding entry point B.

As another example factor, the application determines whether the group as evaluated in block 706 is effective on the topic, i.e., contributing to the topic at least to a specified degree to advance the topic towards completion (block 714). If the group is effective, ("Yes" path of block 714), the application proceeds to evaluate other factors. If the group is not effective ("No" path of block 714), the application proceeds to exit point C to enter a process depicted in FIG. 8 which has a corresponding entry point C.

As another example factor, the application determines whether one or more future meetings are needed to advance the topic towards completion (block 716). If a future meeting is not needed, ("No" path of block 716), the application proceeds to evaluate other factors. If a future meeting is needed ("Yes" path of block 716), the application proceeds to exit point D to enter a process depicted in FIG. 9 which has a corresponding entry point D.

As another example factor, the application determines whether more information is needed from one or more participants to perform a step in process 700 (block 718). If more information is not needed, ("No" path of block 718), the application proceeds to evaluate other factors. If more information is needed ("Yes" path of block 718), the application proceeds to exit point E to enter a process depicted in FIG. 10 which has a corresponding entry point E.

Figure 8:
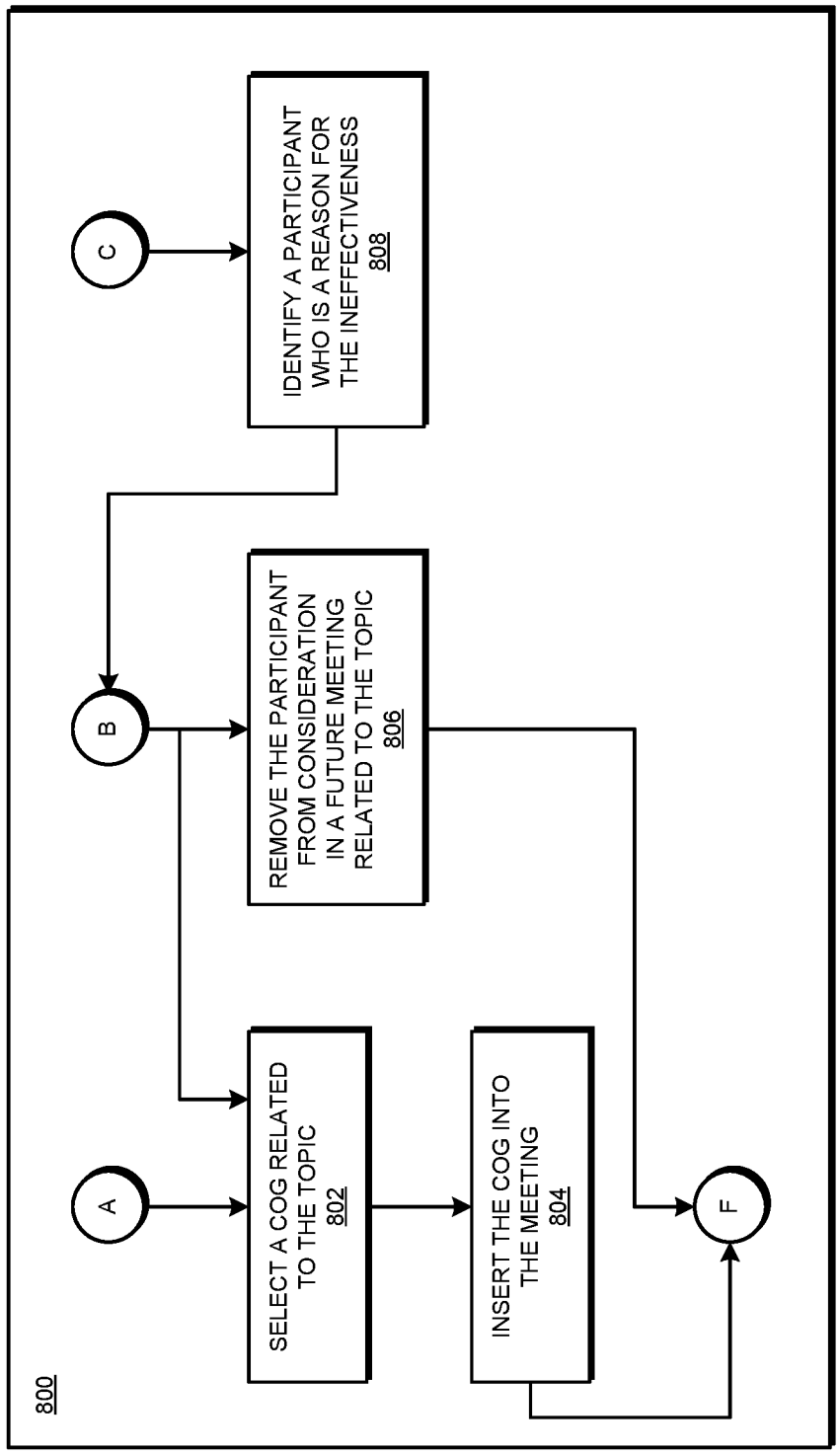
FIG. 8 depicts certain continuations of process 700 in accordance with an illustrative embodiment.

With reference to FIG. 8, this figure depicts certain continuations of process 700 in accordance with an illustrative embodiment. Process 800 includes the continuations that connect with exit points A, B, and C of process 700 in FIG. 7.

The application enters at entry point A from block 710 of FIG. 7. The application selects a cog related to the topic (block 802). The application inserts the cog into the meeting (block 804). The application exits at exit point F to re-enter process 700 of FIG. 7 at entry point F.

The application enters at entry point B from block 712 of FIG. 7. The application can perform blocks 802-804, or block 806, or blocks 802, 804, and 806, depending upon the circumstances. In block 806, the application removes the participant from consideration in a future meeting related to the topic (block 806). The application exits at exit point F to re-enter process 700 of FIG. 7 at entry point F.

The application enters at entry point C from block 714 of FIG. 7. The application identifies a participant who is a reason for the ineffectiveness of the group (block 808). The application proceeds to entry point B and proceeds therefrom thereafter as shown.

Figure 9:
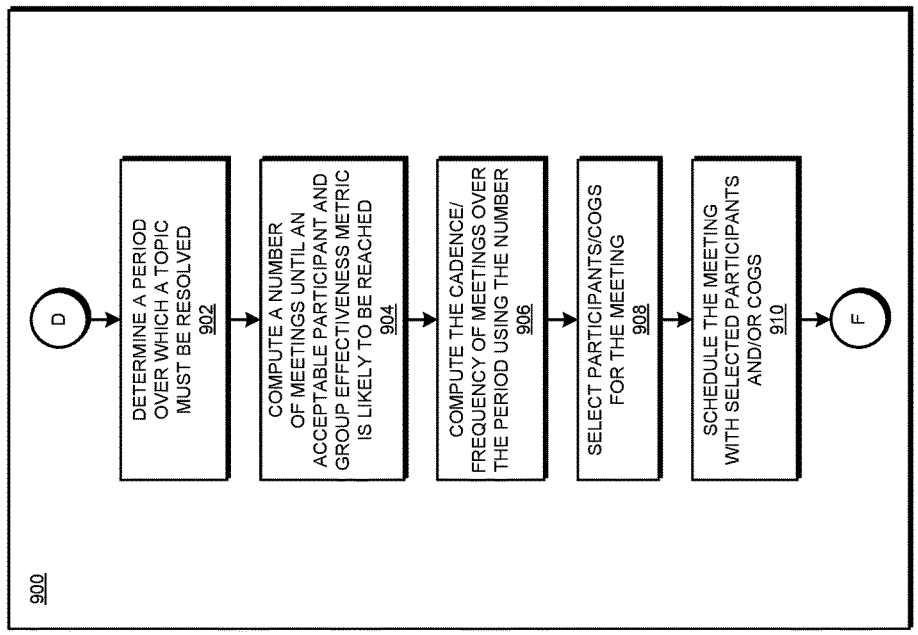
FIG. 9 depicts a certain continuation of process 700 in accordance with an illustrative embodiment.

With reference to FIG. 9, this figure depicts a certain continuation of process 700 in accordance with an illustrative embodiment. Process 900 includes the continuation that connects with exit point D of process 700 in FIG. 7.

The application enters at entry point D from block 716 of FIG. 7. The application determines a total period over which a topic must be resolved (block 902). The application computes a number of meetings until an acceptable participant effectiveness metric and group effectiveness metric is likely to be reached for the topic (block 904).

The application computes from the total period and the number of meetings, a cadence of the future meetings over the total period (block 906). Note that the meetings need not be spaced from each other by equal time distances. Different pairs of meetings can be spaced differently from one another in the set of all future meetings.

The application selects the participants, e.g., the subset of participants as described herein, and/or one or more cogs for a future meeting (block 908). The application schedules the future meeting with the selected participants (block 910).

The application repeats blocks 908 and 910 for as many future meetings as may be needed. The application exits at exit point F to re-enter process 700 of FIG. 7 at entry point F.

With reference to FIG. 10, this figure depicts a certain continuation of process 700 in accordance with an illustrative embodiment. Process 1000 includes the continuation that connects with exit point E of process 700 in FIG. 7.

The application enters at entry point E from block 718 of FIG. 7. The application composes a set of questions, e.g., questions related to the meeting, the topic, the group, and/or the participant (block 1002). The application sends a question to the participant, e.g., via the participant interface of the participant during the meeting (block 1004). The application interactively collects one or more responses from the participant in response to the question (block 1006).

The application repeats block 1004-1006 as many times as may be needed to collect sufficient additional information. The application exits process 1000 to re-enter process 700 of FIG. 7 at block 706.

Thus, a computer implemented method, system or apparatus, and computer program product are provided in the illustrative embodiments for autonomic meeting effectiveness and cadence forecasting and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   configuring an autonomous system to receive meeting participation data from a meeting participation tool that is configured in a meeting environment;
   collecting, using the autonomous system via the meeting participation tool of the meeting environment, the meeting participation data of a meeting in-progress, the meeting comprising a group of participants;

analyzing, using the autonomous system, the meeting participation data to identify a topic being discussed in the meeting;

forecasting, using the autonomous system, using a processor and a memory, using a trend of affective states of a participant, a future affective state of the participant relative to the topic;

evaluating, using the autonomous system, the future affective state to conclude that data contributed by the participant at a future time in the meeting is not likely to progress the topic to completion by at least a specified degree;

selecting, using the autonomous system, a cognitive system (cog) trained in the subject-matter; and adding, using the autonomous system, the cog to the meeting before the future time and while the meeting is in-progress, the adding the cog causing the cog to receive the meeting participation data from the meeting participation tool in the meeting environment, and further causing the cog to insert a cog output in the meeting participation data.

2. The method of claim 1, further comprising:
collecting a past meeting participation data of the past meeting;
extracting a past affective state of the participant by analyzing the data contributed by the participant in the past meeting participation data; and
using the past affective state as a data point in creating the trend of affective states of the participant for the topic.

3. The method of claim 1, further comprising:
collecting a past meeting participation data of the past meeting;
extracting a past somatic state of the participant by analyzing the biometric data of the participant in the past meeting participation data; and
using the past somatic state as a data point in creating the trend of somatic states of the participant for the topic, wherein the forecasting further uses the trend of somatic states.

4. The method of claim 1, further comprising:
further analyzing the meeting participation data to evaluate whether data contributed by the participant in the group is progressing the topic to completion by at least the specified degree; and
performing the forecasting responsive to determining that the data contributed by the participant in the group is not progressing the topic to completion by at least the specified degree.

5. The method of claim 1, further comprising:
determining, by further analyzing the meeting participation data, that data contributed by the group is not progressing the topic to completion by at least a specified degree;
selecting the topic for a future meeting; and
scheduling the future meeting about the topic using a different group.

6. The method of claim 5, further comprising:
adding the cog to the different group as a substitution for the participant.

7. The method of claim 1, further comprising:
determining, by further analyzing the meeting participation data, that data contributed by the group is not progressing the topic to completion by at least a specified degree, wherein selecting the cog and adding the cog are responsive to determining that the data contributed by the group is not progressing the topic to completion by at least a specified degree.

8. The method of claim 1, further comprising:
processing, as a part of analyzing the meeting participation data to identify the topic, the meeting participation data using Natural Language Processing (NLP) to identify the subject-matter, the subject-matter comprising the topic.

9. The method of claim 1, the meeting participation data comprising:
data contributed by the group of participants to the meeting; and
biometric data collected from at least one participant in the group during the meeting.

10. The method of claim 9, wherein the data contributed by the group of participants includes data contributed by a participant one of before and after the meeting.

11. The method of claim 9, wherein the biometric data comprises a voice characteristic of speech data contributed by the at least one participant.

12. The method of claim 9, wherein the biometric data comprises a behavioral characteristic of the at least one participant.

13. The method of claim 9, wherein the biometric data comprises an infrared image of the at least one participant.

14. The method of claim 9, further comprising:
using the biometric data to compute a somatic state of the at least one participant, wherein the somatic state of the at least one participant corresponds to an affective state of the at least one participant relative to the topic.

15. A computer usable program product comprising one or more computer-readable storage devices, and program instructions stored on at least one of the one or more storage devices, the stored program instructions comprising:
program instructions to configure an autonomous system to receive meeting participation data from a meeting participation tool that is configured in a meeting environment;
program instructions to collect, using the autonomous system via the meeting participation tool of the meeting environment, the meeting participation data of a meeting in-progress, the meeting comprising a group of participants;
program instructions to analyze, using the autonomous system, the meeting participation data to identify a topic being discussed in the meeting;
program instructions to forecast, using the autonomous system, using a processor and a memory, using a trend of affective states of a participant, a future affective state of the participant relative to the topic;
program instructions to evaluate, using the autonomous system, the future affective state to conclude that data contributed by the participant at a future time in the meeting is not likely to progress the topic to completion by at least a specified degree;
program instructions to select, using the autonomous system, a cognitive system (cog) trained in the subject-matter; and
program instructions to add, using the autonomous system, the cog to the meeting before the future time and while the meeting is in-progress, adding the cog causing the cog to receive the meeting participation data from the meeting participation tool in the meeting environment, and further causing the cog to insert a cog output in the meeting participation data.

16. The computer usable program product of claim 15, further comprising:
program instructions to collect a past meeting participation data of the past meeting;

program instructions to extract a past affective state of the participant by analyzing the data contributed by the participant in the past meeting participation data; and program instructions to use the past affective state as a data point in creating the trend of affective states of the participant for the topic.

17. The computer usable program product of claim 15, further comprising:

program instructions to collect a past meeting participation data of the past meeting;

program instructions to extract a past somatic state of the participant by analyzing the biometric data of the participant in the past meeting participation data; and program instructions to use the past somatic state as a data point in creating the trend of somatic states of the participant for the topic, wherein the forecasting further uses the trend of somatic states.

18. The computer usable program product of claim 15, wherein the computer usable code is stored in a computer readable storage device in a data processing system, and wherein the computer usable code is transferred over a network from a remote data processing system.

19. The computer usable program product of claim 15, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to configure an autonomous system to receive meeting participation data from a meeting participation tool that is configured in a meeting environment;

program instructions to collect, using the autonomous system via the meeting participation tool of the meeting environment, the meeting participation data of a meeting in-progress, the meeting comprising a group of participants;

program instructions to analyze, using the autonomous system, the meeting participation data to identify a topic being discussed in the meeting;

program instructions to forecast, using the autonomous system, using a processor and a memory, using a trend of affective states of a participant, a future affective state of the participant relative to the topic;

program instructions to evaluate, using the autonomous system, the future affective state to conclude that data contributed by the participant at a future time in the meeting is not likely to progress the topic to completion by at least a specified degree;

program instructions to select, using the autonomous system, a cognitive system (cog) trained in the subject-matter; and program instructions to add, using the autonomous system, the cog to the meeting before the future time and while the meeting is in-progress, adding the cog causing the cog to receive the meeting participation data from the meeting participation tool in the meeting environment, and further causing the cog to insert a cog output in the meeting participation data.

* * * * *